Figure 1:
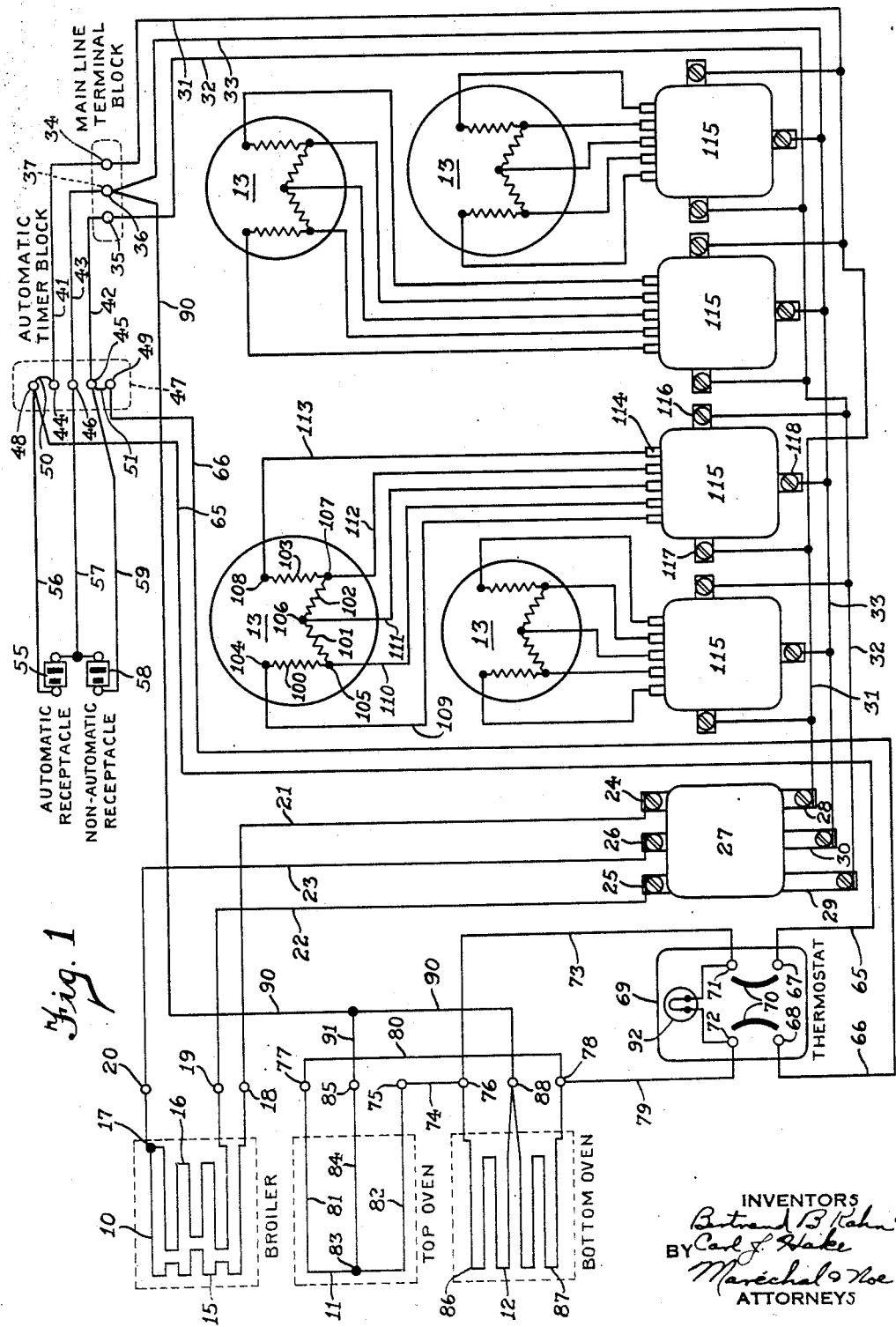

May 21, 1940.　　B. B. KAHN ET AL　　2,201,584
STOVE
Filed April 14, 1938　　2 Sheets-Sheet 1

INVENTORS
Bertrand B Kahn &
BY Carl F Hake
Marechal & Noe
ATTORNEYS

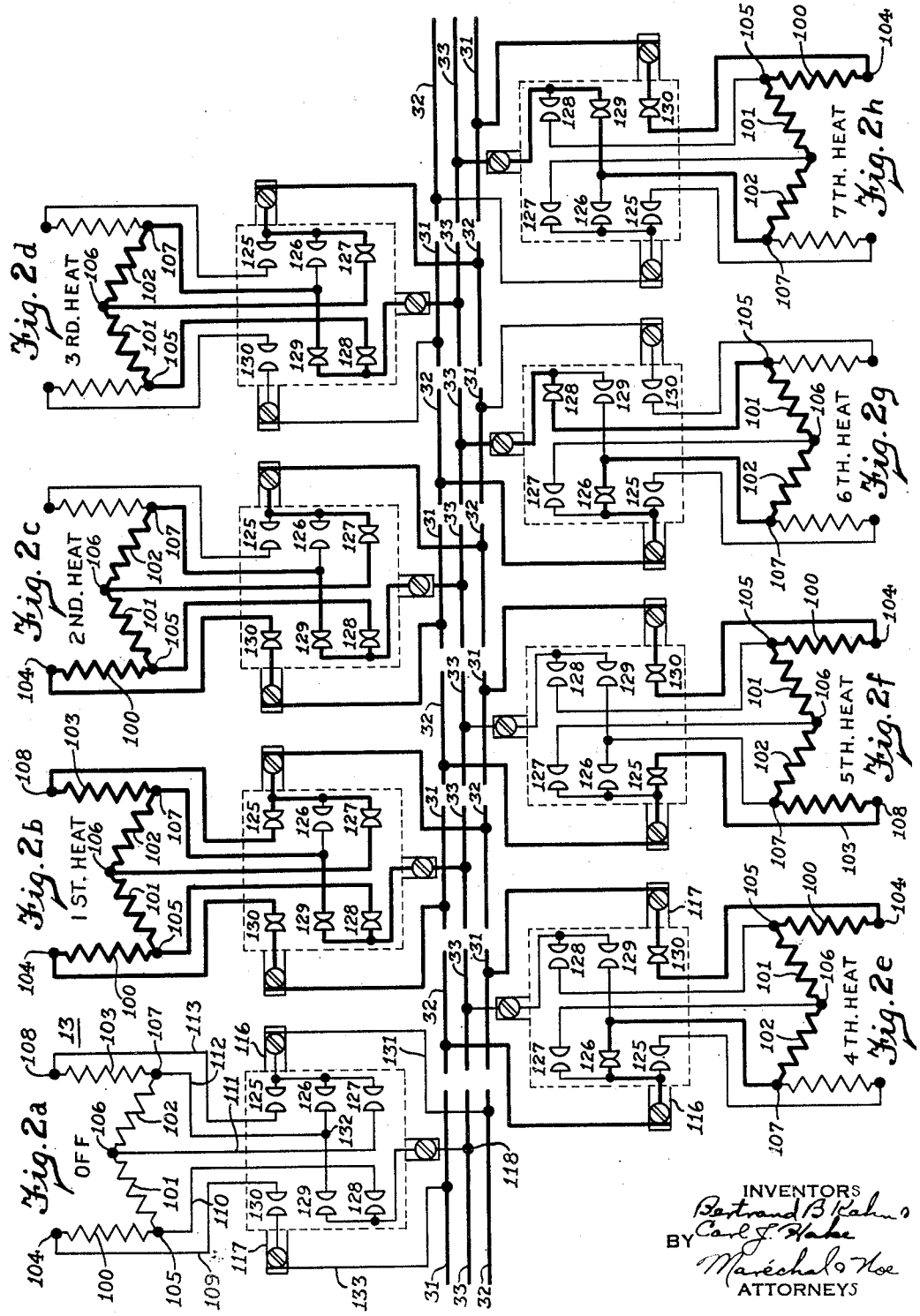

Patented May 21, 1940

2,201,584

UNITED STATES PATENT OFFICE 2,201,584

STOVE

Bertrand B. Kahn, Cincinnati, and Carl J. Hake, Hamilton, Ohio, assignors to The Estate Stove Company, Hamilton, Ohio, a corporation of Ohio Application April 14, 1938, Serial No. 201,900

12 Claims. (Cl. 219—19)

This invention relates to electrical heating systems and more particularly to a heating system for an electric range.

A principal object of this invention is the provision of a simple and efficient heating system for an electric range or the like having a substantial range of heats from a high heat position to a low heat position and with such selective intermediate positions that substantially any heating may be secured as desired for a particular operation.

It is a further object to provide an electric range which is of universal character such that it will operate similarly and with substantially the same heating results when connected to any of the multiple voltage power distribution systems now in common use for residence supply.

It is also an object to provide such an electric range having a cooking top portion arranged for operation over a substantial range of heats and in a series of graduated steps and adapted to be energized from any of said multiple voltage power systems with substantially the same heating results, at least in the higher heat positions.

Other objects and advantages of the invention will be apparent from the following description, the appended claims, and the accompanying drawings, in which:

Fig. 1 is a diagrammatic illustration of the heating units and electrical connections for an electric range provided with the complete interchangeable heating system of the invention; and Figs. 2a to 2h inclusive show the connections to each of the heating units of the cooking top and illustrate in Fig. 2a the connections with the control switch in the "off" position, in Fig. 2b the connections with the control switch in the high heat position, and in the succeeding figures the connections with the control switch in successively lower heating positions.

Electric ranges as heretofore made have included a cooking top with a plurality of heating units therein corresponding to the burners in the cooking top of a gas range. Where however the gas burner was infinitely adjustable from its maximum to its minimum operating position, the electric range was usually provided with only a single intermediate heating position and thus the flexibility and selectability of the gas burner were not realized. In accordance with the present invention a heating system for the cooking top of an electric range is provided which not only includes a wide range of heats from a high, rapid heating and cooking position to a very low simmering position, but which also has such selective intermediate positions, that substantially any desired intermediate heat may be secured for whatever purpose desired. Thus a system is provided which approaches more nearly the selectivity of a gas burner, and which has a sufficient number of graduated positions so that approximately the desired heat may be secured.

Electric ranges are preferably provided with the various heating units permanently connected to a terminal block or the like which is adapted to be connected to a suitable source of electric power. To provide a relatively wide range of heats for the various heating units the source of electric power preferably comprises a multi-voltage source such as a three wire power system of the character in which there is a relatively high voltage across two of the wires, herein referred to as the outside wires, and a relatively low voltage across each one of said two wires and the third wire, herein referred to as the central wire or neutral. Power systems of this general character, however, are not standardized or uniform in the various communities and sections. In some localities it may comprise a three wire direct current system of the Edison type, in another locality it comprises a three wire single phase system, and in still other localities it may consist of two phase wires and the neutral of a three phase, Y or star connected, alternating current system. Of these various electrical systems the first two are generally similar in that the voltage across the two outside wires is usually twice the voltage across each one of the outside wires and the central wire. Thus if there is a voltage of 240 volts across the outside wires the voltage across each one of these wires and the central wire will be 120 volts. In the case of the latter system, however, the voltage across the outside wires is approximately only 1.7 times the phase voltage between the outside wires and the neutral. Thus if the phase voltage is 120 volts the voltage across the two outside phase lines will be only about 208 volts. Since the heating or wattage output of a given heating unit varies with the square of the applied voltage it will be evident that if the heating unit is connected across the two outside wires of the power system a substantially less amount of heat will be developed when the range is connected to a three phase system than when the range is connected to a direct current or single phase system. When a heating unit designed for use on 240 volts is used on a 208 volt circuit, it fails to develop sufficient heat and this has necessitated in the past that separate units and separate ranges be built and carried in stock so that a range could be provided suitable for the particular type of power available.

In accordance with the present invention a universal range is provided which is interchangeable as to the type of power source to which it may be connected and which operates as efficiently and effectively when connected to one such source as when connected to another. The range is preferably provided with broiler, oven and cooking top heating units comprising a plurality of resistor sections. The heating of the broiler and cooking top units is preferably controlled by means of multi-position switches which vary the connections between the various resistor sections and the power feed lines. The oven heating units are preferably controlled by means of a thermostatic switch which is responsive to the heat condition within the oven. The various connections and switches for each of the units are so arranged that substantially the same amount of heat will be developed by the broiler and oven heating units as well as in a majority of the heating stages of the cooking top heating units including the higher heating stages regardless of the type of power system to which the range is connected. For practical purposes therefore the invention provides a complete heating system for the range so that the entire range may be used interchangeably on any one of such multi-voltage systems.

Referring to the drawings which illustrate a preferred embodiment of the invention there is shown in Fig. 1 a broiler heating unit 10, a top oven heating unit 11, a bottom oven heating unit 12, and a plurality of cooking top heating units 13. The broiler heating unit comprises two resistor sections 15 and 16 electrically connected together as indicated at 17. The two ends of the resistor sections and the intermediate junction 17 are electrically connected to the terminals 18, 19 and 20 respectively and lead wires 21, 22 and 23 connect these terminals to the terminals 24, 25 and 26 respectively of a multi-position control switch 27. Terminals 28, 29 and 30 connect the control switch 27 to three lead wires 31, 32 and 33 which are connected to the terminals 34, 35 and 36 respectively of a main line terminal block 37. The two outside terminals 34 and 35 of the terminal block are adapted to be connected to the outside or high voltage wires of a three wire source of electric power and the intermediate terminal 36 is adapted to be connected to the central or neutral wire of such source.

The control switch 27 is of suitable construction and preferably comprises a multi-position switch in which a single operating shaft or lever is moved to a plurality of positions to control the operation of a plurality of contacts arranged within the switch. Such a switch may comprise for example a rotatable shaft upon which is mounted one or more cams adapted to open and close predetermined contacts in each of the switch positions. In accordance with the present invention the switch preferably has an off position and three different heating positions; high, medium and low. The contacts are so arranged that in the high heating position the terminal 24 is connected to the terminal 28, the terminal 25 is connected to the terminal 29, and the terminal 26 is connected to the terminal 30; in the medium heat position the terminal 25 is connected to the terminal 29 and the terminal 26 is connected to the terminal 30, terminal 24 being unconnected; and in the low heat position the terminal 25 is connected to the terminal 29 and the terminal 24 is connected to the terminal 30, the terminal 26 being unconnected. With such an arrangement of contacts it is evident that in the high heat position of the switch the resistor section 15 is connected between the main line terminals 34 and 36 and the resistor section 16 is connected between the main line terminals 35 and 36; in the medium heating position of the switch the resistor section 16 is connected between the main line terminals 35 and 36; and in the low heat position the resistor sections 15 and 16 are connected in series between the main line terminals 35 and 36. Since the voltage between the terminals 34 and 36 and the terminals 35 and 36 is exactly the same whether the terminal block is connected to a direct current or a single phase alternating current system, for example a 120–240 volt system, or to two phases of a four wire, Y connected, three phase alternating current system, for example, a 120–208 volt system, the broiler heating unit 10 will develop the same heat regardless of the system to which the terminal block is connected.

In certain cases the provision of multiple heats for the broiler is not desired and in such case the switch 27 is provided merely as an on and off switch, the connections in the on position being the same as in the high heat position described above.

Lead wires 41, 42 and 43 connect the main line terminals 34, 35 and 36 with the terminals 44, 45 and 46 respectively of an automatic timer block 47. The timer block 47 is adapted to receive an automatic timer mechanism of suitable character which makes and breaks a contact between the terminals 44 and 45 and two terminals 48 and 49, respectively, in accordance with a predetermined setting of the mechanism. Should it be desired to omit the automatic timer mechanism jump leads may be connected between the terminals 44 and 48 and the terminals 45 and 49 as indicated at 50 and 51 in Fig. 1.

An electrical receptacle 55 is connected across the contacts 46 and 48 by means of lead wires 56 and 57 and a receptacle 58 is connected between the terminals 45 and 46 by means of the lead wires 59 and 57. The receptacle 55 is under the control of the automatic timer mechanism and being automatic in nature is adapted to control the operation of an appliance such as a coffee pot or the like. The receptacle 58 is connected at all times to the main line terminals and being non-automatic in nature is adapted to receive a connection to an electric light or the like.

Lead wires 65 and 66 connect the terminals 48 and 49 to terminals 66 and 67, respectively, on one side of a thermostatic switch 69. The switch 69 and associated controls are preferably the type disclosed in Patent No. 2,123,699, copending herewith, and assigned to the same assignee as this invention and embodying means for adjusting the setting of the thermostatic switch to regulate the temperature of the oven to a predetermined value, means for assuring disconnection of the baking units in the off position of the adjusting means, and means for preventing simultaneous energization of baking and broiling units. The switch 69 also preferably includes double pole thermostatically actuated contact means 70 adapted to automatically open and close a connection between the terminal 67 and 71 and the terminal 68 and 72 of the thermostatic switch in response to temperature conditions in the oven. Lead wires 73 and 74 connect the switch terminal 71 to an end terminal 75 of the oven heating unit 11 and to an end terminal 76 of the oven heating unit 12. The other end terminals 77 and 78, respectively, of the heating units 11 and 12 are connected to the switch terminal 72 by means of lead wires 79 and 80.

The upper oven heating unit 11 comprises two similar resistor sections 81 and 82 connected together as indicated at 83, and a lead wire 84 connects the junction 83 to a terminal 85. The lower oven heating unit 12 comprises two similar resistor sections 86 and 87 connected together at a terminal 88. The terminals 85 and 88 are preferably connected to a midpoint of the heating units 11 and 12, respectively, so that the resistance in the resistor section 81 equals that in section 82 and the resistance in section 86 equals that in section 87. Lead wires 90 and 91 connect the terminals 85 and 88 of the oven heating units to the mid-terminal 36 of the main line terminal block.

From the foregoing description it will be evident that when the thermostatic switch 69 is closed each of the resistor sections of the oven heating units 11 and 12 will be connected across one of the outside main line terminals and the central or neutral main line terminal. In this manner the same voltage will be applied across each of these resistor sections irrespective of the type of power source utilized and the heat produced by the oven heating units will be the same for all types of source. The switch 69 is preferably provided with a pilot light 92 adapted to indicate when the circuit to the oven heating units is closed.

Each of the cooking top heating units 13 comprises four equal resistor sections 100, 101, 102 and 103 which are connected in series and provided with terminal junctions 104, 105, 106, 107 and 108. The units are arranged with each section properly distributed so that a substantially uniform heating effect is secured regardless of the number of sections energized. Lead wires 109, 110, 111, 112 and 113 connect the respective terminals 104—108 with five terminals 114 of a control switch indicated generally at 115. Three terminals 116, 117 and 118 connect the control switch to the lead wires 31, 32 and 33 which are connected to the main line terminals 34, 35 and 36. The connections from the control switches 115 to the outside lead wires 31 and 32 are preferably reversed for two of the switches, as shown in Fig. 1, to provide a better load balance when a plurality of the cooking top heating units are in use.

The control switches 115 are preferably of the multi-position type and are adapted to connect the main line lead wires to the various resistor sections of the cooking top heating units in a plurality of different ways to provide a plurality of different graduated heating stages for each of the cooking top heating units. As shown, the switch has an off position and seven different heat positions ranging from a high heat to a low simmering heat the use of such relatively large number of stages thereby providing a wide range of heats and providing for securing practically any desired intermediate heating condition. The connections to the cooking top heating unit and the arrangement of the switch contacts in each position of the control switch are illustrated in Figs. 2a through 2h of the drawings in which closed circuits are indicated by heavy lines and open circuits by light lines.

Referring to these figures the control switch 115 comprises six pairs of contacts 125, 126, 127, 128, 129 and 130 which may be moved to their respective open and closed positions in each position of the control switch by any suitable means such as a plurality of suitably shaped cams mounted on a common rotatable shaft. One side of each of the contacts 125, 126 and 127 is connected to the switch terminal 116, and a lead 131 connects the terminal 116 to one of the outside main line lead wires, for example the wire 32. The opposite side of the contacts 125 is connected to the end terminal 108 of the heating unit by means of the lead wire 113. The opposite side of the contacts 126 is connected to the terminal 107 of the heating unit by means of lead wire 112. The other side of the contacts 127 is connected to the terminal 106 of the heating unit by means of the lead 111. One side of each of the contacts 128 and 129 is connected to the terminal 118 which connects with the central or neutral main line lead wire 33. The opposite side of the contacts 128 is connected to the terminal 105 of the heating unit by means of the lead wire 110. The other side of the contacts 129 connects with the lead wire 112 as indicated at 132. One side of the switch contacts 130 connects with the terminal 117, and a lead 133 connects the terminal 117 to the outside main line lead wire which is not connected to terminal 116, i. e., the wire 31. The other side of the contacts 130 is connected to the terminal 104 of the heating unit by means of the lead 109.

The off or open circuit position of the switch is illustrated in Fig. 2a. In this position all of the contacts 125—130 are open and no circuit is established between the various resistor sections of the heating unit and the main line feed wires.

Fig. 2b illustrates the connections to the heating unit with the switch in its first or high heat position. In this position of the switch all the contacts except contacts 126 are closed and all four resistor sections of the heating unit are connected to the main line leads. The end terminal 104 is connected through the contacts 130 to the outside wire 31 and the intermediate terminal 105 is connected through the contact 128 to the central or neutral wire 33 thus connecting the resistor section 100 across these two main lead wires. The mid terminal 106 is connected through contact 127 to the outside lead wire 32 thus placing the resistor section 101 of the heating unit across the wires 32 and 33. The other intermediate terminal 107 is connected through contacts 129 to the central or neutral wire 33 thus placing the resistor section 102 across the wires 32 and 33. The remaining end terminal 108 is connected through contact 125 to the outside lead wire 32 thus placing the resistor section 103 of the heating unit across the wires 32 and 33. Since the voltage across the wires 31 and 33 and across the wires 32 and 33 is the same regardless of the type of source to which the main line terminal block of the range is connected it will be apparent that the heat developed by the heating unit with the control switch in its first or high heat position will be the same for all of these sources.

Fig. 2c illustrates the connections for the second heat position of the switch in which only three resistor sections 100, 101, and 102 are used. With the switch in this position the contacts 125 and 126 are both open and the remaining contacts 127—130 are all closed. The connections from the terminals 104, 105, 106 and 107 to the feed lines 31, 32 and 33 are the same as in Fig. 2b thus placing each of the resistor sections 100, 101 and 102 across one of the outside feed wires and the central or neutral feed wire.

Fig. 2d illustrates the third heat position of the central switch in which only two of the resistor elements, 101 and 102, are employed. In this position of the switch the contacts 125, 126 and 130 are opened and the contacts 127, 128 and 129 are closed. The connections from the terminals 105, 106 and 107 to the feed wires 32 and 33 are the same as in Figs. 2b and 2c of the drawings and here again each of the resistor sections employed is connected across an outside line and the central or neutral line.

Fig. 2e illustrates the fourth heat position of the control switch in which three of the resistor sections, 100, 101 and 102 are connected in series across the two outside line wires 31 and 32. In this position of the switch the contacts 126 and 130 are closed and all of the other contacts are opened thus connecting the terminal 104 of the heating unit to the outside line 31 and the terminal 107 to the outside line 32.

Fig. 2f illustrates the connections for the fifth heat position of the switch in which all four resistor sections 100, 101, 102 and 103 are connected in series across the two outside lines 31 and 32. In this position of the switch the contacts 125 and 130 are closed and all of the remaining contacts are open thus connecting terminal 104 of the heating unit to outside line 31 and terminal 108 to outside line 32.

Fig. 2g illustrates the connections for the sixth heat position of the control switch in which the two resistor sections 101 and 102 are connected in series across one of the outside wires and the central or neutral wire 33. With the switch in this position the contacts 126 and 128 are closed and the remaining contacts are open thereby connecting terminal 105 to the central or neutral wire 33 and terminal 107 to the outside wire 32.

Fig. 2h shows the connections with the control switch in its seventh or low heat position in which the three resistor sections 100, 101 and 102 are connected in series across one of the outside wires and the central or neutral wire. In this position of the switch the contacts 129 and 130 are closed and the remaining contacts are open thereby connecting terminal 104 of the heating unit to the outside wire 31 and the terminal 107 to the central or neutral wire 33.

From the foregoing description it will be evident that in all positions of the cooking top control switches except the fourth and fifth heat positions the same voltage will be applied to each of the various resistor sections employed regardless of which of the types of source is utilized, and, accordingly, the same heat will be developed in each of these switch positions irrespective of such source. In the fourth and fifth heat positions of the control switch 115 there will be some difference between the heat developed when the range is connected to a direct current or single phase alternating current system and when it is connected to a three phase alternating current system, but such differences occur in portions of the heating range of the cooking top unit where the precise amount of heat developed is relatively unimportant and, accordingly, do not affect the operation or effectiveness of the range to any material extent. In the highest heat position the heat developed is the same regardless of which of the power sources is utilized and thus the system assures proper maximum supply of heat when connected to any of the power sources.

The same is true of a majority of the lower heat positions including second and third high positions, and the two lowest positions. Thus for all practical purposes the range is completely interchangeable as to the type of source to which it is connected and the broiler, oven and cooking top heating units develop substantially the same amount of heat whether such source comprises a direct current, single phase alternating current or multi-phase alternating current systems as described above.

As an example of a range provided with the heating system of the invention and adapted to be interchangeably connected to a 120-240 volt direct current or single phase alternating current system or to a 120-208 volt three phase four wire alternating current system, the broiler heating unit 10 may comprise two resistor sections 15 and 16 each capable of developing 1275 watts when the control switch 27 is in the high heat position wherein each of the resistor sections has 120 volts applied to the terminals thereof. The oven is provided with a top heating unit 11 adapted to develop 800 watts when the thermostatic control switch 69 is closed to apply 120 volts to the terminals of each of the resistor sections 81 and 82; each such resistor section developing 400 watts. The bottom heating unit 12 of the oven develops 2600 watts when the thermostatic switch 69 is closed to apply 120 volts across each of the resistor sections 86 and 87; each such resistor section developing approximately 1300 watts.

Each of the resistor sections 100, 101, 102 and 103 of the cooking top heating unit 13 preferably has the same resistance and develops 500 watts when connected to a 120 volt power source. Thus with the range connected to a 120-240 volt direct current system or to a single phase alternating current system of like voltage the cooking top heating unit will develop approximately the following wattages: 2000 watts with the control switch 115 in the first or high heat position, 1500 watts with the switch in the second heat position, 1000 watts in the third heat position, 667 watts in the fourth heat position, 500 watts in the fifth heat position, 250 watts in the sixth heat position and 167 watts in 7th or low heat position. When the range is connected to a 120-208 volt three phase system in the manner hereinabove described the cooking top heating unit will develop approximately the following wattages: 2000 watts in the first or high heating position of the control switch, 1500 watts in the second heat position, 1000 watts in the third heat position, 500 watts in the fourth heat position, 375 watts in the fifth heat position, 250 watts in the sixth heat position and 167 watts in the seventh heat position. It will be evident, however, that the resistance of one or more of the cooking top heating units may, if desired, be increased or decreased to provide a different range of heats for some of the units.

In the practicing of this invention certain of the heating stages described above may be omitter to provide a cooking top arrangement having less than the seven stages described. For example by omitting certain of the camming operations which control the positions of the several switches, one or more of the intermediate or lower heat positions may be eliminated. Generally however applicants have found it desirable to utilize at least four graduated heating stages and for securing the added flexibility in adjustment as described, prefer to use up to seven such stages. The invention also provides a universal range in which substantially the same heat is developed in at least a plurality of the heating stages including the higher stages regardless of which of the commonly used power systems to which the range is connected. The larger number of heating stages provides a highly flexible heating system having a range of heats and heating stages which for all practical purposes gives substantially similar results, as regards selectivity of adjustment, with the heating stages which may be obtained with a gas range.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an electric heating system of the character described, a heating unit comprising at least three resistor sections connected in series and provided with terminal junctions at the ends of each of said sections, main line connecting means comprising two terminals adapted to be connected to two power lines having a relatively high voltage across said lines and a third power terminal adapted to be connected to a third power line having a relatively low voltage across said third line and each of said two lines, and means including a multi-position switch means having a plurality of switch contact means for establishing different circuits between said resistor sections and said main line terminals to provide at least four different heating stages, said contact means connecting each of said resistor sections across one or the other of said two high-voltage terminals and said third terminal in a high heating position of said switch, and said contact means connecting a plurality of said resistor sections either individually or in series across one or the other of said two high-voltage terminals and said third terminal in each of a plurality of other positions of said switch to provide a plurality of heating stages in addition to said high heating stage in which the heat developed is substantially independent of the relatively high voltage applied to said two terminals.

2. In an electric heating system of the character described for the cooking top of an electric range adapted to be energized from a multi-voltage power source, a heating unit comprising at least three resistor sections connected in series and provided with terminal junctions at the ends of each of said sections, main line connecting means comprising two terminals adapted to be connected to two lines of said power source having a relatively high voltage thereacross and a third terminal adapted to be connected to a third line of said power source having a relatively low voltage across said third line and each of said two lines, means including a multi-position switch means having a plurality of switch contact means for establishing different circuits between said resistor sections and said main line terminals to provide at least four different heating stages, said contact means connecting each of said resistor sections across one or the other of said two high-voltage terminals and said third terminal in a high heating position of said switch, and said contact means connecting a plurality of said resistor sections either individually or in series across one or the other of said two high-voltage terminals and said third terminal in each of a plurality of other positions of said switch to provide a plurality of heating stages which in conjunction with said high heating stage form at least a majority of the graduated heating stages and in each of which including the high stage the heat developed is substantially independent of the relatively high voltage applied to said two terminals.

3. In an electric heating system of the character described for the cooking top of an electric range adapted to be energized from a multi-voltage power source, a heating unit comprising at least four resistor sections connected in series and provided with terminal junctions at the ends of each of said sections, main line connecting means comprising two terminals adapted to be connected to two lines of said power source having a relatively high voltage across said lines and a third terminal adapted to be connected to a third line of said power source having a relatively low voltage across said third line and each of said two lines, means including a multi-position switch means having a plurality of switch contact means for establishing different circuits between said resistor sections and said main line terminals to provide a plurality of different heating stages, said contact means connecting each of said resistor sections across one or the other of said two high-voltage terminals and said third terminal in a high heating position of said switch, and said contact means connecting a plurality of said resistor sections either individually or in series across one or the other of said two high-voltage terminals and said third terminal in each of a plurality of other positions of said switch to provide in conjunction with said high heating stage at least five stages in each of which the heat developed is substantially independent of the relatively high voltage applied to said two terminals.

4. In an electric heating system of the character described for the cooking top of an electric range adapted to be energized from a multi-voltage power source, a heating unit comprising at least four resistor sections connected in series and provided with terminal junctions at the ends of each of said sections, main line connecting means comprising two terminals adapted to be connected to two lines of said power source having a relatively high voltage across said lines and a third terminal adapted to be connected to a third line of said power source having a relatively low voltage across said third line and each of said two lines, means including a multi-position switch having a plurality of switch contact means for establishing different circuits between said resistor sections and said main line terminals to provide at least seven different graduated heating stages said contact means connecting each of said resistor sections across one or the other of said two high-voltage terminals and said third terminal in a high heating position of said switch, and said contact means connecting a plurality of said resistor sections either individually or in series across one or the other of said two high-voltage terminals and said third terminal in each of a plurality of other positions of said switch to provide a plurality of heating stages which in conjunction with said high heating stage form at least a majority of the graduated heating stages and in each of which including the high stage the heat developed is substantially independent of the relatively high voltage applied to said two terminals.

5. In an electric heating system of the character described, a heating unit comprising at least three resistor sections connected in series to provide four terminal junctions including two intermediate terminal junctions, main line connecting means comprising two terminals adapted to be connected to two power lines having a relatively high voltage across said lines and a third terminal adapted to be connected to a third power line having a relatively low voltage across said third line and each of said two lines, means including a single multi-position switch for selectively connecting and disconnecting one of said intermediate junctions to said third main line terminal, means including said switch for selectively connecting and disconnecting the two terminal junctions adjacent said one intermediate junction to at least one of said two main line terminals, and means including said switch for selectively connecting and disconnecting the fourth of said junction terminals to either said third terminal or to one of said two terminals.

6. In an electric heating system of the character described, a heating unit comprising four resistor sections connected in series to provide five terminal junctions including two end terminal junctions, a mid-junction and two intermediate junctions, main line connecting means comprising two terminals adapted to be connected to two power lines having a relatively high voltage across said lines and a third terminal adapted to be connected to a third power line having a relatively low voltage across said third line and each of said two lines, means for selectively connecting and disconnecting said mid-junction to one of said two main line terminals, and means for selectively connecting and disconnecting said intermediate junctions to said third main line terminal and said end terminal junctions to one or the other of said two main line terminals to provide a plurality of selective graduated heating stages.

7. In an electric heating system of the character described, a heating unit comprising four resistor sections connected in series to provide five terminal junctions including two end terminal junctions, a mid-junction and two intermediate junctions, main line connecting means comprising two terminals adapted to be connected to two power lines having a relatively high voltage across said lines and a third terminal adapted to be connected to a third power line having a relatively low voltage across said third line and each of said two lines, means connecting said mid junction to one of said two main line terminals, means connecting said intermediate junction to said third main line terminal, and means for selectively connecting and disconnecting the end terminal junctions of said heating unit to at least one of said two main line terminals.

8. In an electric heating system of the character described for the cooking top of an electric range, a heating unit comprising four resistor sections connected in series to provide five terminal junctions including two end terminal junctions, a mid-junction and two intermediate junctions, main line connecting means comprising two terminals adapted to be connected to two power lines having a relatively high voltage across said lines and a third terminal adapted to be connected to a third power line having a relatively low voltage across said third line and each of said two lines, a multi-position switch electrically connected to said main line terminals, means including contacts in said switch for connecting said resistor sections to said terminals in a plurality of selective heating stages, said switch in one position connecting said end junctions and said mid junction of the resistor sections to at least one of said two main line terminals and said intermediate junctions to said third terminal for a high heating stage, the switch in the second position connecting one of said end junctions and said mid junction to at least one of two said terminals and said two intermediate junctions to said third terminal for a second heating stage, the switch in a third position connecting said mid junction to at least one of said two terminals and said intermediate junctions to said third terminal for a third heating stage, the switch in the fourth position connecting one of said end junctions to one of said two terminals and the intermediate junction most remote from said one end junction to the other of said two terminals for a fourth heating stage, the switch in a fifth position connecting one of said end junctions to one of said two terminals and the other end junction to the other of said two terminals for a fifth heating stage, the switch in a sixth position connecting one of said intermediate junctions to one of said two terminals and the other of said intermediate junctions to said third terminal to provide a sixth heating stage, and the switch in a seventh position connecting one of said end junctions to one of said two terminals and the intermediate junction most remote from said one end junction to said third terminal to provide a seventh heating stage.

9. In an electric heating system of the character described for the cooking top of electric ranges, a heating unit comprising at least three resistor sections connected in series to provide four terminal junctions including two intermediate junctions, main line connecting means comprising two terminals adapted to be connected to two power lines having a relatively high voltage across said lines and a third terminal adapted to be connected to a third power line having a relatively low voltage across said third line and each of said two lines, a multi-position switch electrically connected to said main line terminals, means including contacts in said switch for connecting said resistor sections to said terminals in a plurality of selective heating stages, said switch in one position connecting one of said intermediate junctions to said third terminal, the two junctions adjacent said one intermediate junction to at least one of said two terminals and the fourth junction to said third terminal to provide one heating stage, the switch in a second position connecting one end of said three resistor sections to one of said two terminals and the opposite end of said three resistor sections to the other of said two terminals to provide a second heating stage, and the switch in a third position connecting one end of said three resistor sections to one of said two terminals and the opposite end of said three sections to said third terminal to provide a third heating stage.

10. In an electric heating system of the character described, a heating unit comprising four resistor sections connected in series to provide five terminal junctions including two end terminal junctions, a mid-junction and two intermediate junctions, main line connecting means comprising two terminals adapted to be connected to two power lines having a relatively high voltage across said lines and a third terminal adapted to be connected to a third power line having a relatively low voltage across said third line and each of said two lines, means for selectively connecting and disconnecting said mid-junction to one of said two main line terminals, means for selectively connecting and disconnecting one of said intermediate junctions to either said third terminal or to one of said two terminals, and means for selectively connecting and disconnecting said end terminal junctions to said two main line terminals.

11. In a universal electric range of the character described adapted to be interchangeably energized from one of a plurality of different three wire, multi-voltage power sources each having a relatively high voltage across two of said wires and a relatively low voltage across the third wire and each of said two wires, terminal connections for said range comprising two main line terminals adapted to be connected to the high voltage wires of said source and a third main line terminal adapted to be connected to the third wire of said source, a cooking top heating unit comprising a plurality of resistor sections connected in series and provided with terminal junctions at the ends of each section, a multi-position switch means adapted to be connected to said power source, means including contact means in said switch means for selectively establishing different circuits between the resistor sections of said cooking top heating unit and said power source to provide a plurality of graduated heating stages in at least a majority of which including the highest heating stage the heat developed is substantially the same when said terminals are connected to one of said supply sources as when said terminals are connected to another of said supply sources, an upper oven heating unit, a lower oven heating unit, each of said oven heating units having a contact terminal at substantially its mid-point, means providing a continuous electrical connection between said intermediate contact terminal of said upper oven heating unit and said intermediate contact terminal of said lower oven heating unit, means for connecting said continuous connection to said third main line terminal and for connecting the ends of each of said oven heating units to said two main line terminals to thereby provide a completely universal and standardized range in which the heating units including the oven heating units have substantially the same heating range when said main line terminals are connected to any one of said different power sources, and adjustable thermostatic switch means arranged in at least two of said main terminal connecting means for controlling the energization and deenergization of said oven in accordance with a predetermined temperature condition to be maintained within said oven heating units.

12. In a universal electric range of the character described adapted to be interchangeably energized from one of a plurality of different three wire, multi-voltage power sources each having a relatively high voltage across two of said wires and a relatively low voltage across the third wire and each of said two wires, terminal connections for said range comprising two main line terminals adapted to be connected to the high voltage wires of said source and a third main line terminal adapted to be connected to the third wire of said source, a broiler heating unit, means including a connection between substantially the mid-point of said broiler heating unit and said third main line terminal for connecting the broiler heating unit to said power source, a cooking top heating unit comprising a plurality of resistor sections connected in series and provided with terminal junctions at the ends of each section, a multi-position switch means adapted to be connected to said power source, means including contact means in said switch means for selectively establishing different circuits between the resistor sections of said cooking top heating unit and said power source to provide a plurality of graduated heating stages in at least a majority of which including the higher and lower heating stages the heat developed is substantially the same when said terminals are connected to one of said supply sources as when said terminals are connected to another of said supply sources, an upper oven heating unit, a lower oven heating unit, each of said oven heating units having a contact terminal at substantially its mid-point, means providing a continuous electrical connection between said intermediate contact terminal of said upper oven heating unit and said intermediate contact terminal of said lower oven heating unit, means for connecting said continuous connection to said third main line terminal and for connecting the ends of each of said oven heating units to said two main line terminals to thereby provide a completely universal and standardized range in which the heating units including the oven heating units have substantially the same heating range when said main line terminals are connected to any one of said different power sources, and adjustable thermostatic switch means arranged in at least two of said main terminal connecting means for controlling the energization and deenergization of said oven heating units in accordance with a predetermined temperature condition to be maintained within said oven, said main terminal connecting means providing for directly connecting said thermostatic switch means to a plurality of said main line terminals and to said oven heating units.

BERTRAND B. KAHN.
CARL J. HAKE.